(12) United States Patent
Ishibashi et al.

(10) Patent No.: US 8,939,064 B2
(45) Date of Patent: Jan. 27, 2015

(54) LINEAR ACTUATOR

(75) Inventors: Koichiro Ishibashi, Tsukubamirai (JP); Seiji Takanashi, Noda (JP); Motohiro Sato, Toride (JP); Jiro Mandokoro, Moriya (JP); Koji Hara, Tsukubamirai (JP); Toshio Sato, Tsukuba (JP)

(73) Assignee: SMC Kabushiki Kaisha, Tokyo (JP)

( * ) Notice: Subject to any disclaimer, the term of this patent is extended or adjusted under 35 U.S.C. 154(b) by 898 days.

(21) Appl. No.: 13/042,629

(22) Filed: Mar. 8, 2011

(65) Prior Publication Data

US 2011/0247487 A1    Oct. 13, 2011

(30) Foreign Application Priority Data

Apr. 7, 2010   (JP) ................................. 2010-088546

(51) Int. Cl.
*F01B 29/00* (2006.01)
*F16J 1/10* (2006.01)
*F15B 15/14* (2006.01)

(52) U.S. Cl.
CPC ......... *F15B 15/1471* (2013.01); *F15B 15/1404* (2013.01)
USPC ................................. 92/88; 92/129

(58) Field of Classification Search
CPC ................................. F15B 15/02; F15B 15/14
USPC ..................... 92/88, 129, 15, 20; 91/406, 408
See application file for complete search history.

(56) References Cited

U.S. PATENT DOCUMENTS

| | | | |
|---|---|---|---|
| 3,859,147 A * | 1/1975 | Philip | ............................. 420/69 |
| 3,994,539 A | 11/1976 | Gottlieb | |
| 4,748,866 A | 6/1988 | Weyer | |
| 5,097,716 A | 3/1992 | Barbat et al. | |
| 5,363,741 A | 11/1994 | Takada et al. | |
| 5,511,461 A | 4/1996 | Miyachi et al. | |
| 5,884,549 A * | 3/1999 | Hosono et al. | .................. 92/5 R |
| 6,014,924 A | 1/2000 | Stoll et al. | |
| 6,336,390 B1 * | 1/2002 | Sato et al. | ........................ 91/406 |
| 6,832,541 B2 * | 12/2004 | Satou et al. | ....................... 92/88 |
| 7,090,400 B2 | 8/2006 | Kato et al. | |
| 7,191,695 B2 * | 3/2007 | Sato et al. | ...................... 92/13.7 |

(Continued)

FOREIGN PATENT DOCUMENTS

| | | |
|---|---|---|
| CN | 1815046 A | 8/2006 |
| CN | 2837045 Y | 11/2006 |

(Continued)

OTHER PUBLICATIONS

Carpenter, Technical Data Sheet: "Carpenter Stainless Type 440 A", Edition: Apr. 1, 1987, Pertinent Paragraph: Type Analysis, [http://cartech.ides.com/datasheet.aspx?i=101&e=74].*
Latrobe Specialty Steel Company, 440 N-Dur High Quality Martensitic Stainless Steel, Data Sheet (2007).*
Air Products, "Gas Quenching With Air Products' Rapid Gas Quenching Gas Mixture" (2007).*

(Continued)

*Primary Examiner* — Edward Look
*Assistant Examiner* — Daniel Collins
(74) *Attorney, Agent, or Firm* — Oblon, Spivak, McClelland, Maier & Neustadt, L.L.P.

(57) ABSTRACT

The present invention relates to a linear actuator. A slide table of the linear actuator includes a table main body and an end plate connected to another end of the table main body. On a base portion of the table main body, four workpiece retaining holes are formed, and fitting seats are disposed respectively about the workpiece retaining holes on radial outer sides thereof. The fitting seats are formed at the same time that the table main body is formed by press molding.

10 Claims, 11 Drawing Sheets

(56) References Cited

U.S. PATENT DOCUMENTS

| | | | |
|---|---|---|---|
| 7,290,479 B2 * | 11/2007 | Williams et al. ............... | 92/88 |
| 7,806,041 B2 | 10/2010 | Someya et al. | |
| 2006/0056748 A1 | 3/2006 | Maffeis | |
| 2008/0127817 A1 * | 6/2008 | Someya et al. ............... | 92/163 |

FOREIGN PATENT DOCUMENTS

| | | |
|---|---|---|
| JP | 59-58215 | 4/1984 |
| JP | 02-109001 | 8/1990 |
| JP | 09-141533 | 6/1997 |
| JP | 10-61611 | 3/1998 |
| JP | 11-125208 A | 5/1999 |
| JP | 2001-263349 A | 9/2001 |
| JP | 3795968 B2 | 4/2006 |
| JP | 2007-218296 | 8/2007 |
| JP | 2009-150455 | 7/2009 |
| KR | 1998-024027 | 7/1998 |
| KR | 10-2008-0049675 | 6/2008 |
| TW | 460661 | 10/2001 |
| TW | M310272 | 4/2007 |
| TW | 200823373 A | 6/2008 |
| TW | 200934963 A | 8/2009 |

OTHER PUBLICATIONS

Notice of Allowance issued Apr. 3, 2012 in Korean Patent Application No. 2010-61823 (with English translation).

Office Action mailed Apr. 26, 2013, in co-pending U.S. Appl. No. 12/813,879.

Japanese Office Action issued Oct. 29, 2013 in Patent Application No. 2010-088546 with Partial English Translation.

Japanese Office Action issued Oct. 29, 2013 in Patent Application No. 2010-000564 with Partial English Translation.

U.S. Appl. No. 12/813,879, filed Jun. 11, 2010, Koichiro Ishibashi, et al.

U.S. Appl. No. 12/981,214, filed Dec. 29, 2010, Koichiro Ishibashi, et al.

Combined Office Action and Search Report issued Jan. 14, 2013 in Taiwanese Patent Application No. 099119239 with English language translation.

Combined Chinese Office Action and Search Report issued Mar. 21, 2014 in Patent Application No. 201110009957.9 (with English translation).

Office Action issued Jul. 1, 2014 in Japanese Patent Application No. 2010-226848 with English Translation.

* cited by examiner

LINEAR ACTUATOR

CROSS-REFERENCE TO RELATED APPLICATION

This application is based upon and claims the benefit of priority from Japanese Patent Application No. 2010-088546 filed on Apr. 7, 2010, of which the contents are incorporated herein by reference.

BACKGROUND OF THE INVENTION

1. Field of the Invention

The present invention relates to a linear actuator in which, by introduction of a pressure fluid from fluid inlet/outlet ports, a slide table is made to move reciprocally along an axial direction of a cylinder main body.

2. Description of the Related Art

The present applicants, as disclosed in Japanese Laid-Open Patent Publication No. 10-061611, have proposed a linear actuator including a cylinder main body equipped with cylinder chambers to which a pressure fluid is supplied, pistons that are disposed for displacement along the cylinder chambers, and a slide table connected to the pistons and which is displaceable along the cylinder main body. In this type of linear actuator, for example, a workpiece, which makes up an object to be transported, is mounted on an upper portion of the slide table, and by pressing the pistons through the pressure fluid that is supplied to the cylinder chambers, the workpiece can be displaced along the cylinder main body together with the slide table, which is connected to the pistons.

SUMMARY OF THE INVENTION

A general object of the present invention is to provide a linear actuator, which enables a slide table to be formed easily and with high precision, which is capable of stably transporting an object to be transported, and which enables manufacturing costs for the linear actuator to be reduced.

The present invention is a linear actuator in which, by introduction of a pressure fluid from fluid inlet and outlet ports, a slide table is made to move reciprocally along an axial direction of a cylinder main body, comprising:

the cylinder main body, which communicates with the inlet and outlet ports and having a cylinder chamber into which the pressure fluid is introduced;

the slide table having a base portion disposed substantially parallel to the cylinder main body and a mounting portion that projects with respect to the base portion for mounting the object to be transported thereon, the slide table moving reciprocally along the axial direction of the cylinder main body; and a cylinder mechanism having a piston that is arranged for sliding movement along the cylinder chamber, wherein the slide table is made to move reciprocally upon displacement of the piston, wherein the slide table is formed by press molding.

According to the present invention, the slide table can be formed easily by press molding, and when formed by press molding, the mounting portions, which project with respect to the base portion that is substantially parallel to the cylinder main body, can be formed simultaneously with the slide table. As a result, manufacturing costs can be lowered when the linear actuator including the slide table is manufactured, and together therewith, by providing the mounting portions on the slide table, which project with respect to the base portion, compared to a case of mounting an object to be transported over the entirety of the base portion on which such mounting portions are not provided, the object to be transported can be retained securely as well as transported stably and with high precision.

The above and other objects features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENTS

Figure 1:
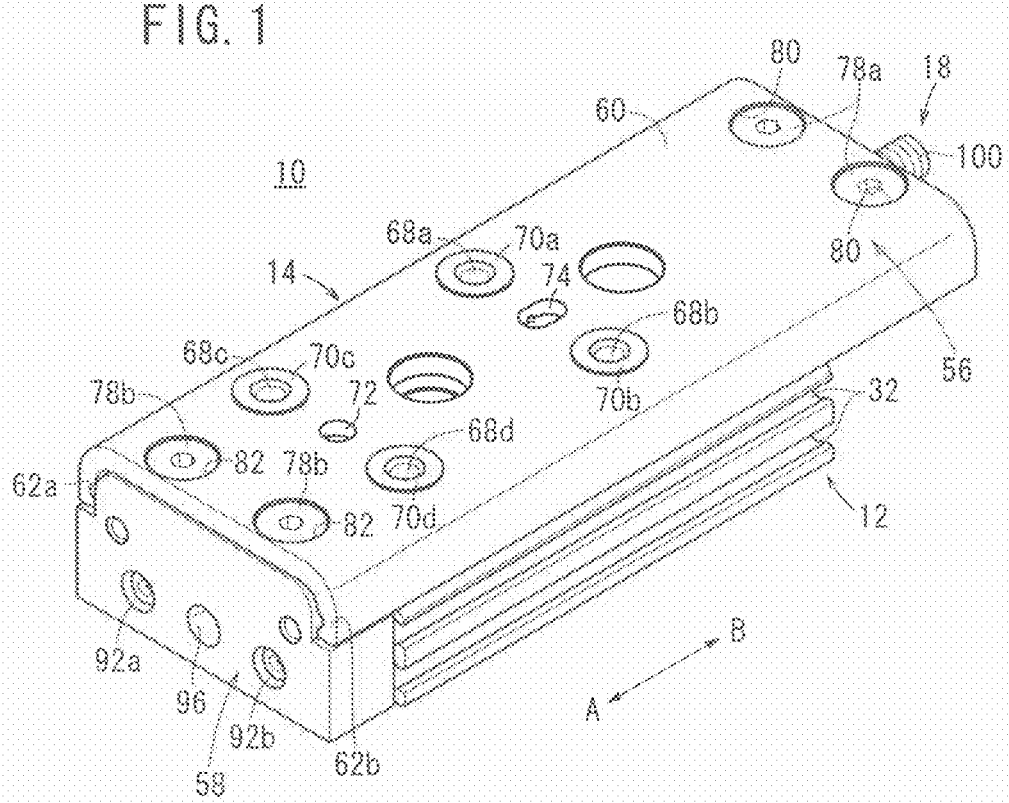
FIG. 1 is an exterior perspective view of a linear actuator according to an embodiment of the present invention.

In FIG. 1, reference numeral 10 indicates a linear actuator according to an embodiment of the present invention.

As shown in FIGS. 1 through 10, the linear actuator 10 comprises a cylinder main body 12, a slide table 14 disposed on an upper portion of the cylinder main body 12 and which undergoes reciprocal motion in a straight line along a longitudinal direction (the direction of arrows A and B), a guide mechanism 16 disposed to intervene between the cylinder main body 12 and the slide table 14 for guiding the slide table 14 in the longitudinal direction (the direction of arrows A and B), and a stopper mechanism 18, which is capable of adjusting a displacement amount of the slide table 14.

The cylinder main body 12, for example, is formed with a rectangular shape in cross section from a metallic material such as aluminum or the like having a predetermined length along the longitudinal direction (the direction of arrows A and B). A recess 20 having a sunken arcuate shape in cross section is formed roughly in the center on the upper surface of the cylinder main body 12, extending along the longitudinal direction (in the direction of arrows A and B). In the recess 20, a pair of penetrating bolt holes 24 is provided, through which connecting bolts 22 are inserted for interconnecting the cylinder main body 12 and the guide mechanism 16.

Figure 8:
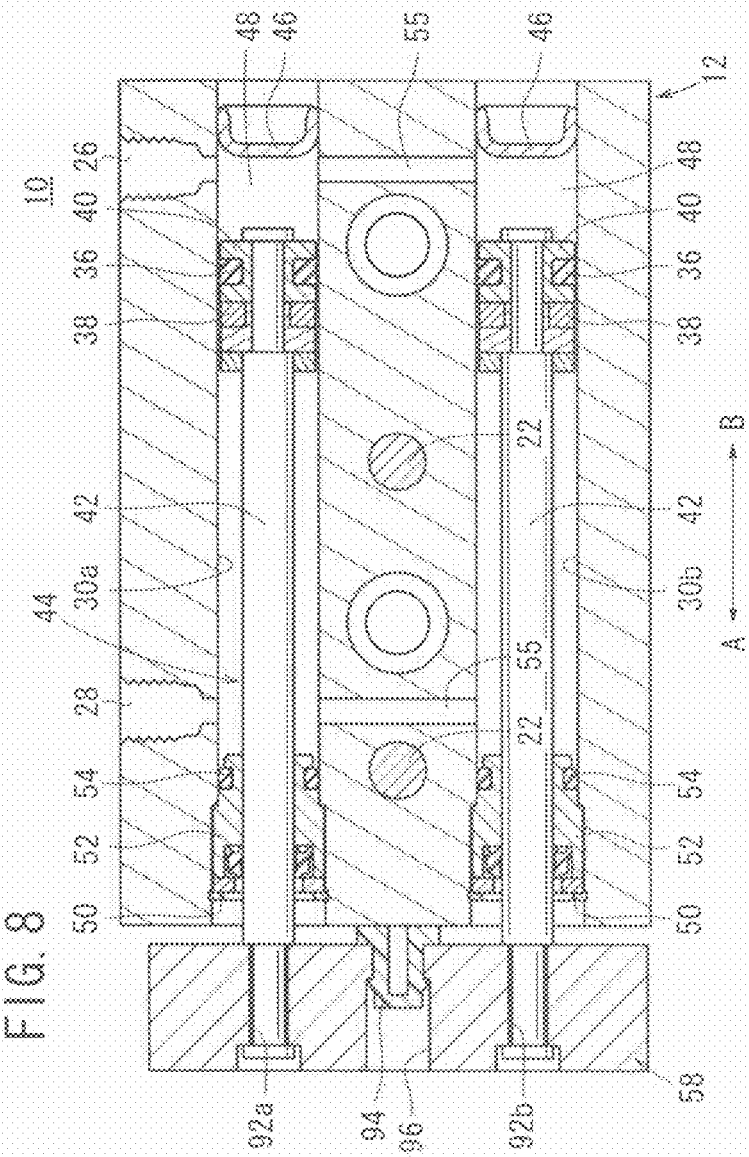
FIG. 8 is a cross sectional view taken along line VIII-VIII of FIG. 7.
Figure 9:
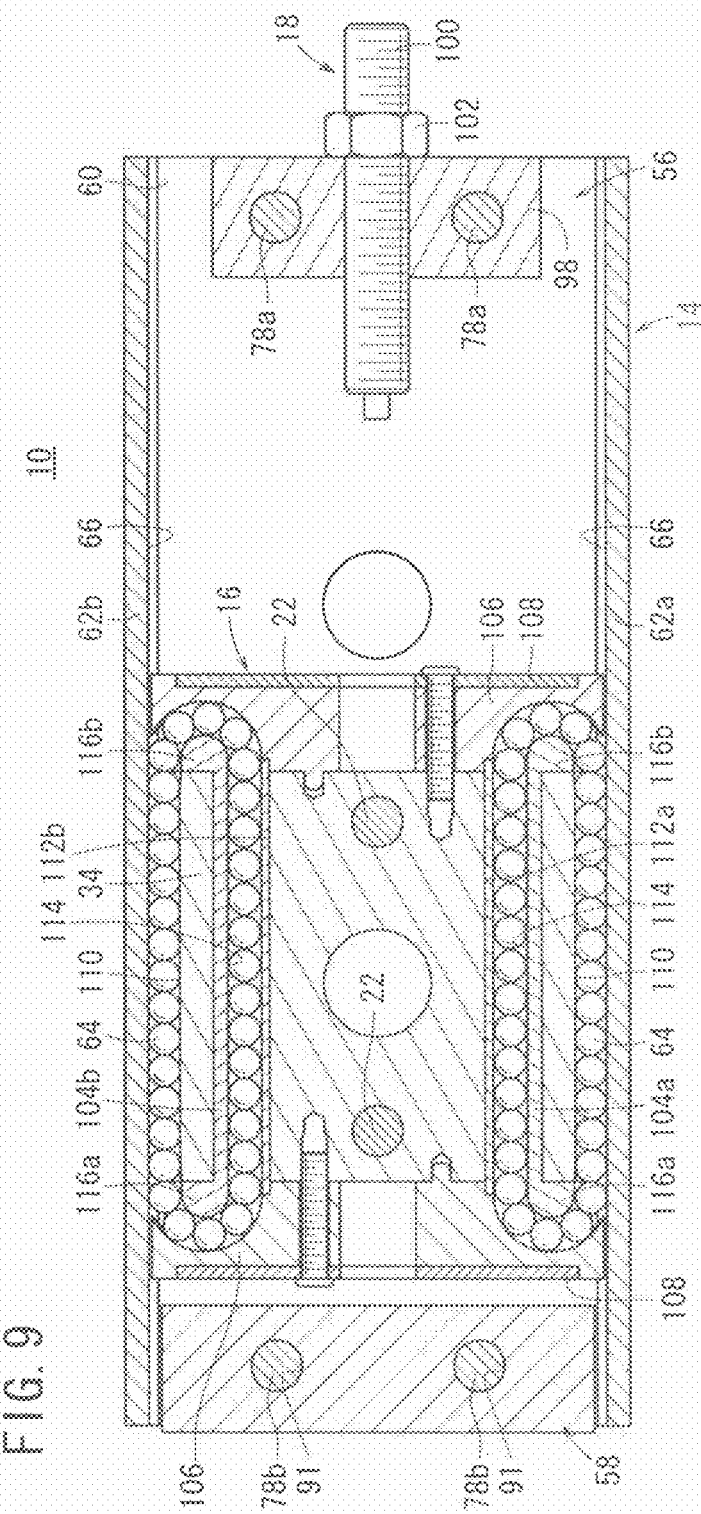
FIG. 9 is a cross sectional view taken along line IX-IX of FIG. 7.
Figure 10:
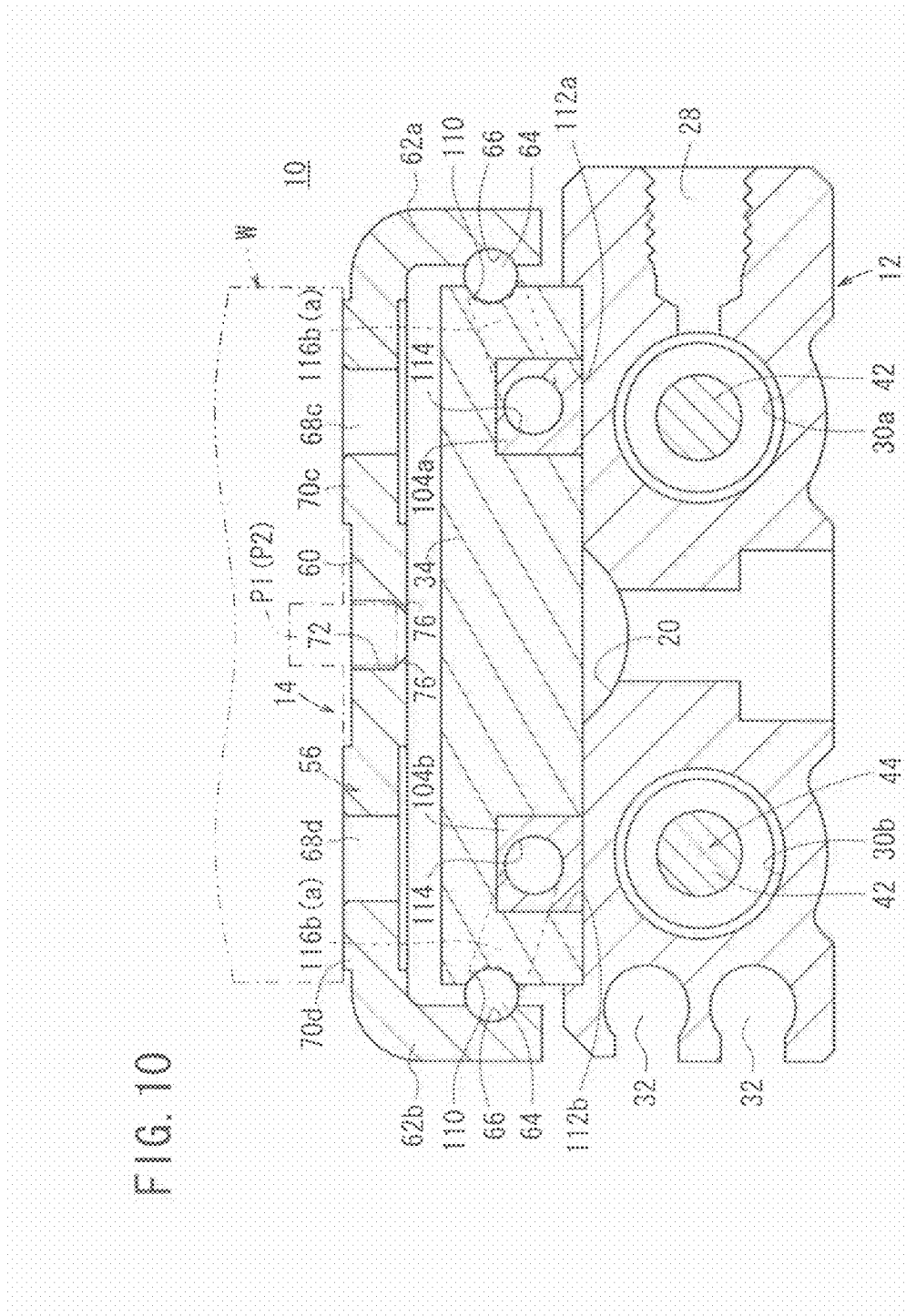
FIG. 10 is a cross sectional view taken along line X-X of FIG. 7.

Further, as shown in FIG. 8, on one side surface of the cylinder main body 12, first and second ports (inlet and outlet ports) 26, 28 for supply and discharge of pressure fluid are formed perpendicularly to the longitudinal direction of the cylinder main body 12, which communicate with a pair of penetrating holes 30a, 30b to be described later. Furthermore, on the other side surface of the cylinder main body 12, two sensor attachment grooves 32 (see FIG. 10) are formed respectively along the longitudinal direction (the direction of arrows A and B), in which sensors (not shown) may be mounted.

On the bottom surface of the cylinder main body 12, a pair of bolt holes 24 are formed centrally in the widthwise direction on the axial line, with connecting bolts 22 being inserted through the bolt holes 24 from below. Additionally, ends of the connecting bolts 22 project from the upper surface of the cylinder main body 12, and are connected mutually by threaded engagement with the guide block 34 of the guide mechanism 16.

On the other hand, inside the cylinder main body 12, two penetrating holes 30a, 30b having circular shapes in cross section are formed, which penetrate along the longitudinal direction (the direction of arrows A and B), the one penetrating hole 30a and the other penetrating hole 30b being laid out substantially in parallel and separated by a predetermined distance.

Inside the penetrating holes 30a, 30b, a cylinder mechanism 44 is provided, including respective pistons 40, each of which has a sealing ring 36 and a magnet 38 installed on the outer circumference thereof, and piston rods 42 connected to the pistons 40. The cylinder mechanism 44 is constituted by the pair of pistons 40 and the piston rods 42, which are installed respectively in the pair of penetrating holes 30a, 30b.

The penetrating holes 30a, 30b are closed and sealed at one ends thereof by plate-like caps 46, with cylinder chambers 48 being formed respectively between the pistons 40 and the caps 46. Further, other ends of the penetrating holes 30a, 30b are sealed hermetically by rod holders 52, which are retained therein via locking rings 50. On the outer periphery of the rod holders 52, o-rings 54 are installed via annular grooves, for thereby preventing leakage of pressure fluid through gaps between the penetrating holds 30a, 30b and the rod holders 52.

The caps 46 are formed, for example, by press molding a plate-like body made of a metallic material. Bent portions of the caps 46 are arranged to face toward one end side (in the direction of arrow B) of the penetrating holes 30a, 30b that are opened to the exterior.

Furthermore, one of the penetrating holes 30a communicates respectively with the first and second ports 26, 28, whereas the other penetrating hole 30b also communicates mutually therewith via a pair of connecting passages 55 formed between the one penetrating hole 30a and the other penetrating hole 30b. More specifically, after introduction of the pressure fluid, which has been supplied to the first and second ports 26, 28, to the one penetrating hole 30a, the pressure fluid also is introduced into the other penetrating hole 30b through the connecting passages 55.

Figure 2:
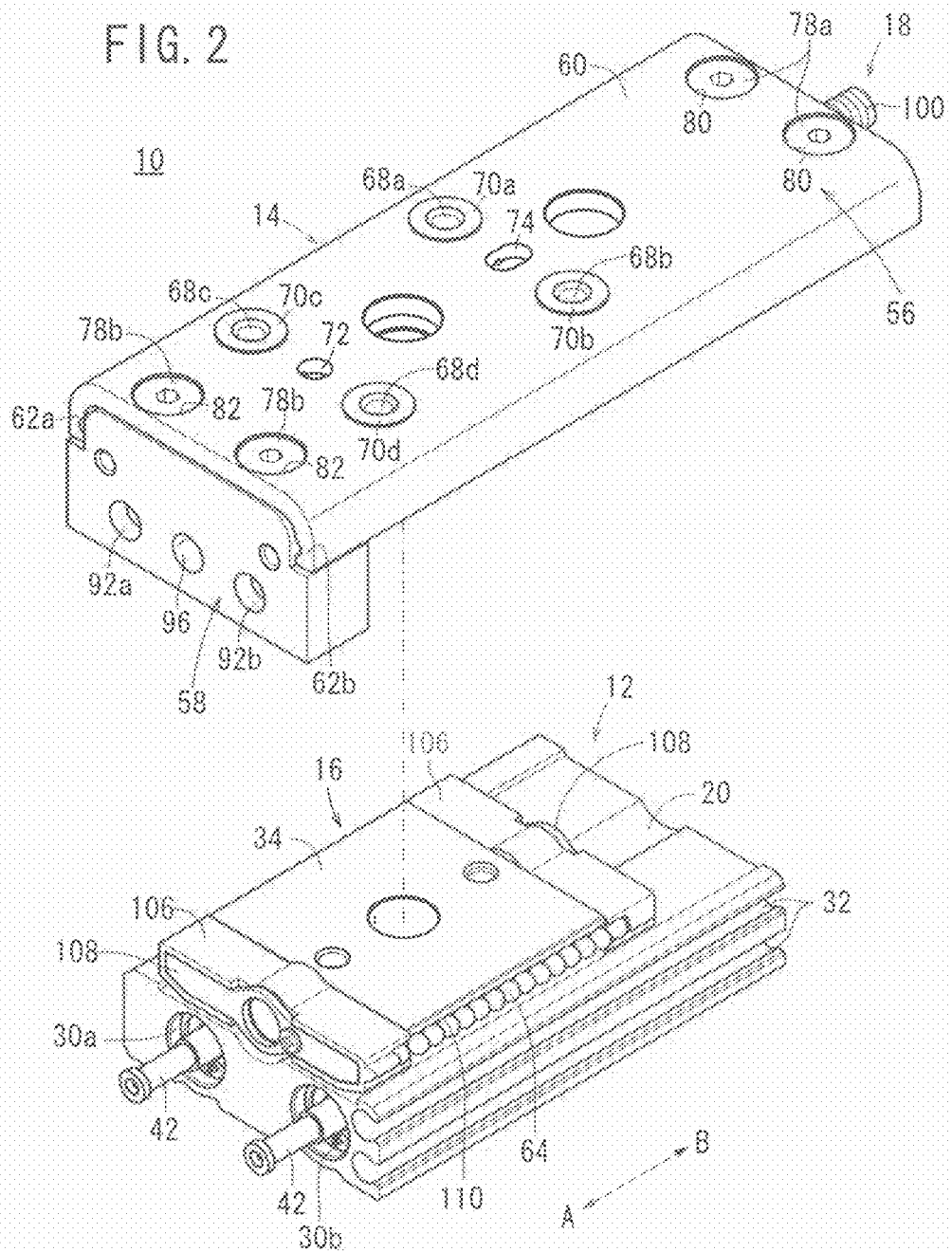
FIG. 2 is an exploded perspective view showing a condition in which a slide table is separated upwardly away from the linear actuator of FIG. 1.
Figure 3:
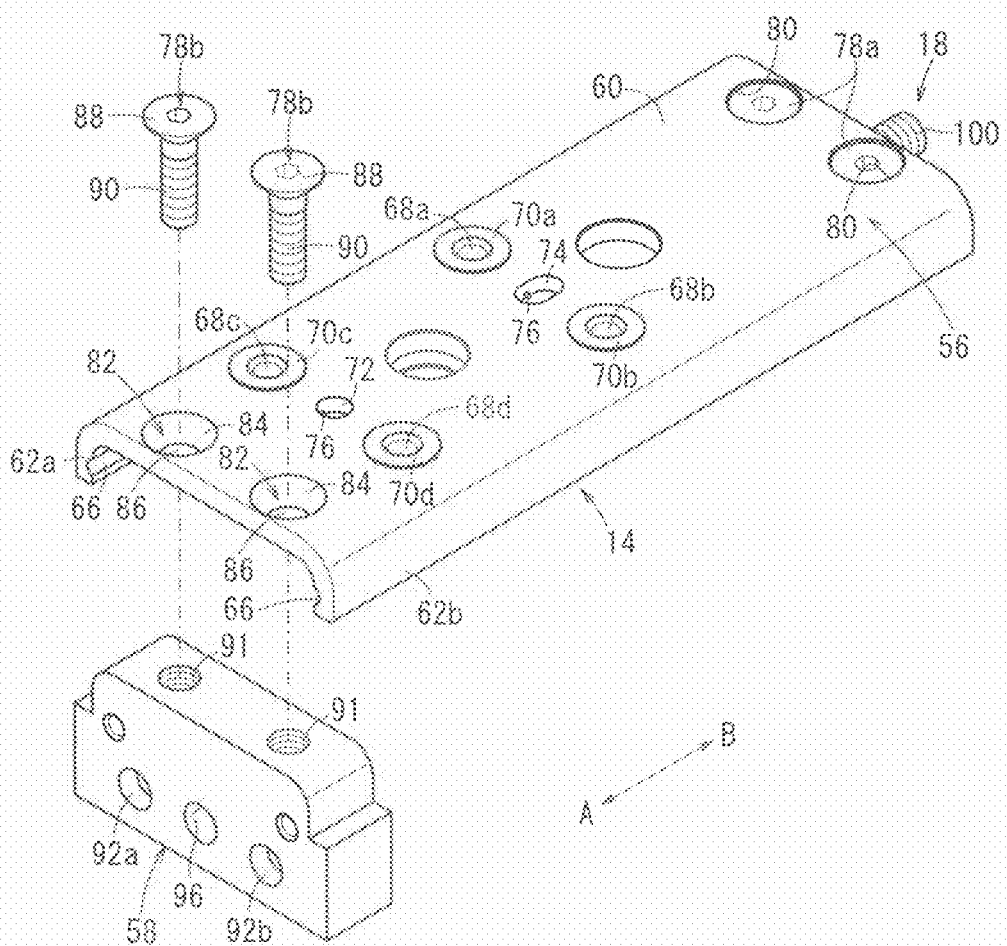
FIG. 3 is an exploded perspective view showing a condition in which an end plate is separated from the slide table of FIG. 2.
Figure 4:
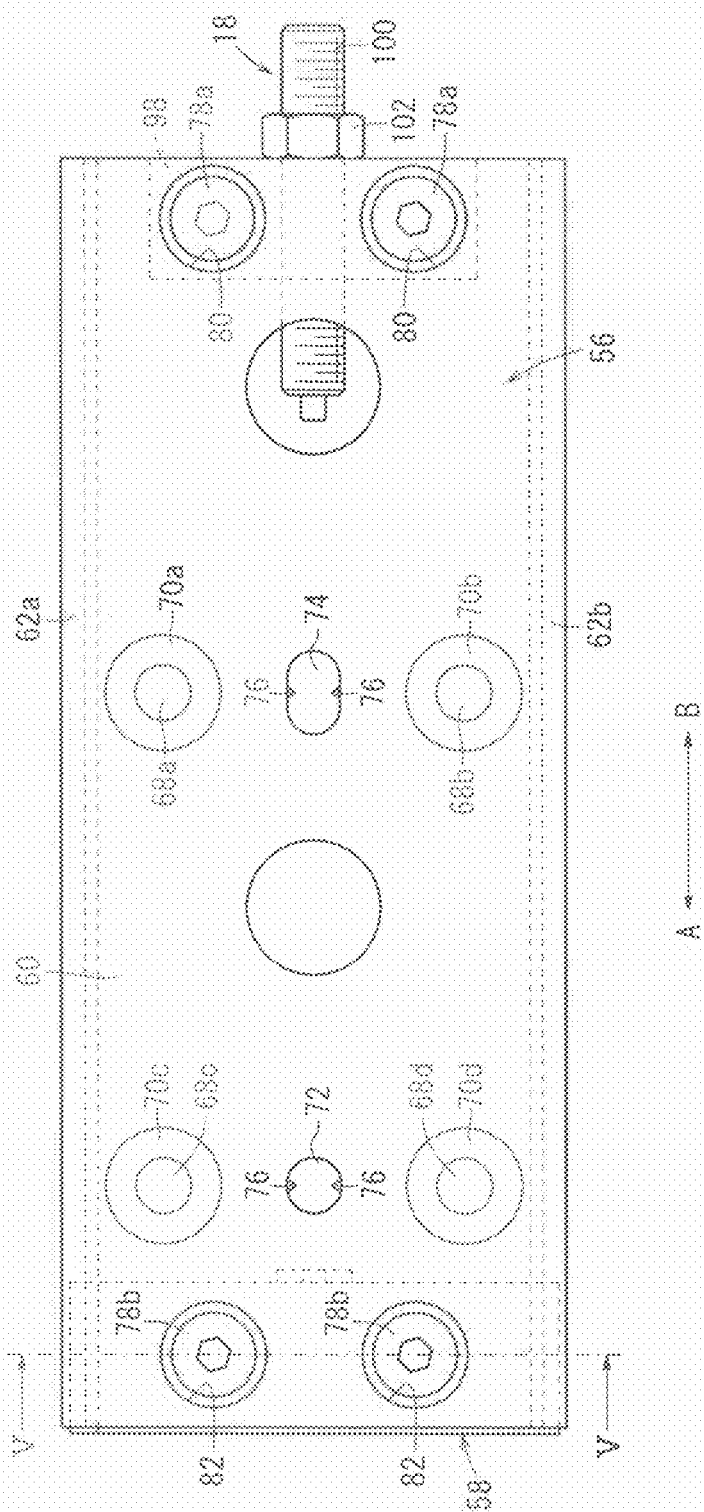
FIG. 4 is a plan view of the slide table of FIG. 2 as viewed from above.
Figure 5:
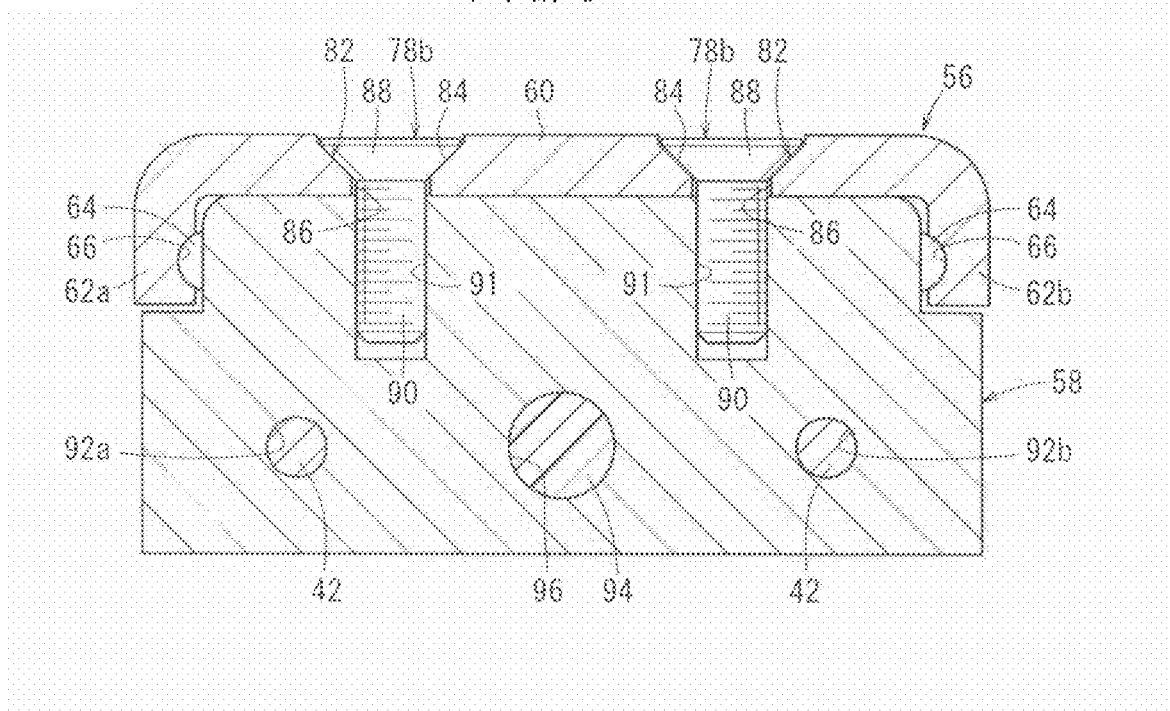
FIG. 5 is a cross sectional view taken along line V-V of FIG. 4.
Figure 6:
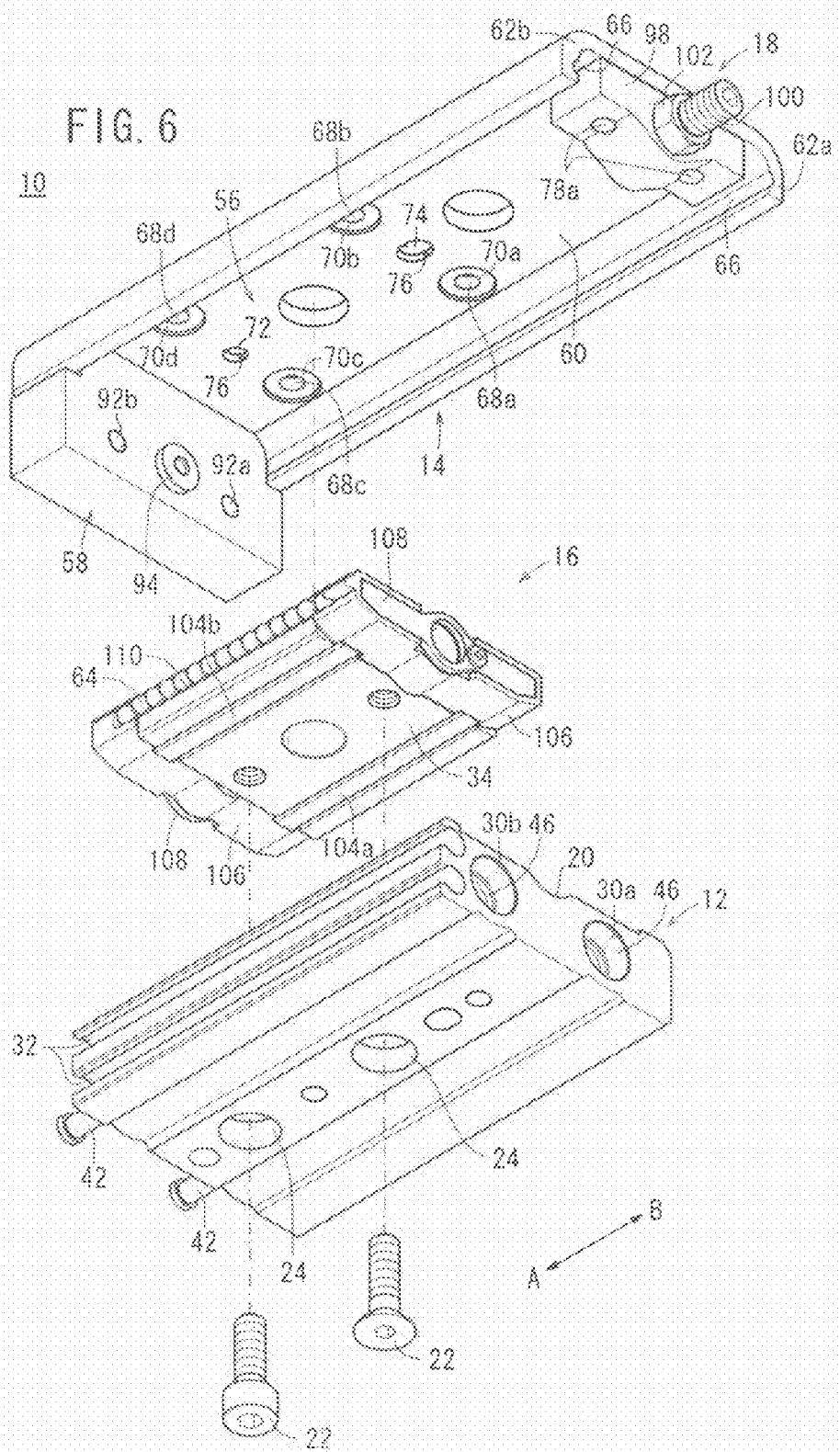
FIG. 6 is an exploded perspective view of the linear actuator of FIG. 1 as viewed from a lower side thereof.
Figure 7:
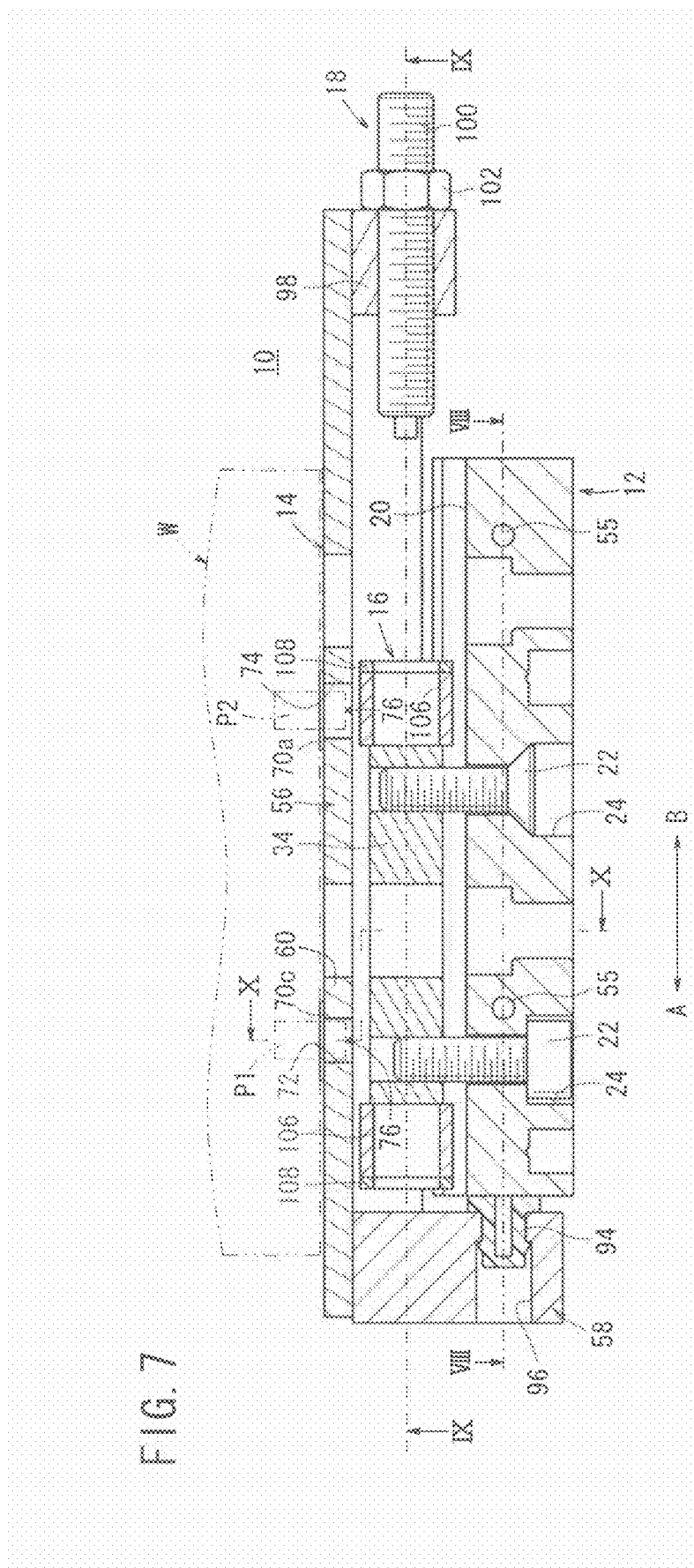
FIG. 7 is an overall vertical cross sectional view of the linear actuator of FIG. 1.

As shown in FIGS. 2 through 4, the slide table 14 comprises a table main body 56, a stopper mechanism 18 connected to one end of the table main body 56, and an end plate 58 connected to the other end of the table main body 56. The end plate 58 is connected perpendicularly with respect to the table main body 56.

The table main body 56 is formed, for example, by press molding a plate material made from a metallic material. More specifically, the table main body 56 is formed of martensitic stainless steel having a carbon content of 0.55% to 0.65%. Press molding is carried out to form the table main body 56 in a desired shape. In addition, the press molded table main body 56 is subjected to quenching by heating the table main body 56 to a predetermined temperature, and thereafter cooling the table main body 56 by exposure to nitrogen gas. Owing thereto, the Rockwell C Scale hardness value ($H_RC$) of the table main body 56 is made to lie within a range of from 58 to 62, and deformation of the table main body 56 is suppressed.

A material manufactured by cold rolling is used as the martensitic stainless steel that forms the material of the table main body 56. More specifically, compared to materials manufactured by hot rolling, variances in the thickness dimension of the table main body 56 are kept small, and dimensional characteristics thereof can be controlled with a high degree of precision when the table main body 56 is formed.

The table main body 56 is made up from a base portion 60 that extends along the longitudinal direction (the direction of arrows A and B), and a pair of guide walls 62a, 62b that extend downward perpendicularly from both sides of the base portion 60. On inner surfaces of the guide walls 62a, 62b, first ball guide grooves (second circulation passages) 66 for guiding balls 64 of a guide mechanism 16, to be described later, are formed. The first ball guide grooves 66 are formed with substantially semicircular shapes in cross section, which are formed at the same time that the table main body 56 is formed by press molding. Further, preferably, the cross sectional shapes of the first ball guide grooves 66 are formed in arcuate shapes, such as a semicircular shape, so that the first ball guide grooves 66 can be formed most easily by press molding.

Further, on the base portion 60, four workpiece retaining holes 68a to 68d are formed between one end portion and the other end portion thereof. Along therewith, fitting seats (mounting portions) 70a to 70d are formed respectively about the workpiece retaining holes 68a to 68d on radial outer sides thereof. Stated otherwise, the fitting seats 70a to 70d are formed in annular shapes centrally about the workpiece retaining holes 68a to 68d.

When the table main body 56 is formed by press molding, the fitting seats 70a to 70b are formed so as to project at a predetermined height with respect to the upper surface of the base portion 60. The workpiece (object to be transported) W is mounted on upper parts of the fitting seats 70a to 70b (see FIGS. 7 and 10). Additionally, for example, after quenching of the table main body 56 is completed, the upper surfaces of the fitting seats 70a to 70d are formed in flat shapes parallel to the base portion 60 by a grinding process or the like, so that a high degree of flatness between the plural fitting seats can be secured.

Stated otherwise, the plural fitting seats 70a to 70d, which are formed by press molding, are subjected to processing, such as a grinding process or the like, so as to possess roughly the same degree of flatness, and therefore workpieces W, which are mounted on the fitting seats 70a to 70d, are capable of being transported in a stable manner.

Further, as shown in FIG. 4, first and second pin holes (positioning holes) 72, 74 are formed respectively between the workpiece retaining holes 68c and 68d as well as between the workpiece retaining holes 68a and 68b, which are separated by predetermined distances in the widthwise direction of the base portion 60. The two first and second pin holes 72, 74 are formed at the same time that the table main body 56 is formed by press molding, and are disposed so as to be separated by a predetermined distance in the longitudinal direction (the direction of arrows A and B) of the base portion 60. The two first and second pin holes 72, 74 are formed to penetrate through the base portion 60 in the thickness direction thereof. Additionally, the first pin hole 72 disposed on the side of the end plate 58 is formed with a circular shape in cross section, whereas the second pin hole disposed on the side of the stopper mechanism 18 is formed with an elongate oblong hole shape in cross section oriented along the longitudinal direction of the base portion 60.

Pairs of projections 76 (see FIG. 10), which project radially inward on inner circumferential surfaces facing the lower side surface of the base portion 60, are disposed respectively in the first and second pin holes 72, 74. Such projections 76, for example, are disposed in confronting relation along the widthwise direction of the base portion 60, and are formed with triangular shapes in cross section tapering gradually in a radial inward direction.

In addition, positioning pins P1, P2 (see FIGS. 7 and 10) for performing positioning of the workpiece W that is mounted on the upper surface of the slide table 14 are inserted respectively in the first and second pin holes 72, 74. At this time, because the positioning pins P1, P2, which are inserted from the upper surface side of the slide table 14, are stopped in engagement by the projections 76, dropping out (i.e., downward falling) of the positioning pins P1, P2 is prevented.

In other words, the projections 76 function as dropout prevention means, which are capable of preventing dropping out of the positioning pins P1, P2 in the first and second pin holes 72, 74.

On one end of the base portion 60 that makes up the table main body 56, a pair of first bolt holes 80 is formed through which bolts (fastening members) 78*a* are inserted for fixing a later-described holder portion 98 of the stopper mechanism 18. On the other end of the base portion 60, a pair of second bolt holes (holes) 82 is formed through which bolts (fastening members) 78*b* are inserted for fixing the end plate 58.

The first and second bolt holes 80, 82 penetrate in a thickness direction perpendicular to the longitudinal direction of extension of the table main body 56, and are made up from conical portions 84 having tapered shapes in cross section that gradually decrease in diameter from the upper surface side toward the lower surface side of the table main body 56, and fixed diameter holes 86 that are formed at lower portions of the conical portions 84. The first and second bolt holes 80, 82 are formed at the same time that the table main body 56 is formed by press molding (see FIG. 5).

On the other hand, the bolts 78*a*, 78*b* comprise flat-head bolts each having a head portion 88 formed in a conical shape and a rod shaped threaded portion 90 that extends from the end of the head portion 88. When the bolts 78*a*, 78*b* are inserted through the first and second bolt holes 80, 82, the head portions 88 thereof are accommodated in the conical portions 84, and the threaded portions 90 are inserted into the holes 86 projecting downwardly therefrom. In addition, as shall be described below, by screw-engagement of the threaded portions 90 respectively into screw holes 91 of the end plate 58 and the holder portion 98 on the stopper mechanism 18, the end plate 58 and the holder portion 98 are connected respectively with respect to the table main body 56.

The end plate 58 is fixed to the other end of the table main body 56 and is disposed so as to face toward an end surface of the cylinder main body 12. The end plate 58 also is fixed to ends of the piston rods 42, which are inserted through a pair of rod holes 92*a*, 92*b* formed in the end plate 58. Owing thereto, the slide table 14 including the end plate 58 is displaceable together with the piston rods 42 along the longitudinal direction (the direction of arrows A and B) of the cylinder main body 12.

Further, on the end plate 58, a damper installation hole 96 opens into which a damper 94 is mounted at a position between the one rod hole 92*a* and the other rod hole 92*b*.

When the damper 94, which is made from an elastic material such as rubber or the like, is mounted in the damper installation hole 96 from the other side surface of the end plate 58 on the side of the cylinder main body 12, the end portion thereof is expanded in diameter and projects outwardly from the other side surface.

The stopper mechanism 18 includes the holder portion 98, which is disposed on a lower surface of one end of the table main body 56, a stopper bolt 100 screw-engaged with respect to the holder portion 98, and a lock nut 102 for regulating advancing and retracting movements of the stopper bolt 100. The stopper mechanism 18 is disposed so as to face toward an end surface of the guide mechanism 16, which is disposed on the cylinder main body 12.

The holder portion 98 is formed in a block-like shape and is fixed from above by the bolts 78*b* with respect to the base portion 60 of the table main body 56 of the slide table 14. In roughly the center of the holder portion 98, the stopper bolt 100 is screw-engaged for advancement and retraction along the axial direction. The stopper bolt 100, for example, comprises a rod shaped stud bolt having threads engraved on the outer circumferential surface thereof. The lock nut 102 is screw-engaged with the stopper bolt 100 at a position that projects from an end surface of the holder portion 98.

Additionally, by threaded rotation of the stopper bolt 100 with respect to the holder portion 98, the stopper bolt 100 is displaced along the axial direction (the direction of arrows A and B), so as to approach and separate away from the guide mechanism 16. For example, after the stopper bolt 100 has been rotated so as to project a predetermined length toward the side of the guide mechanism 16 (in the direction of arrow A), by threaded rotation of the lock nut 102 and by movement and abutment thereof against the side surface of the holder portion 98, advancing and retracting movements of the stopper bolt 100 are regulated.

As shown in FIGS. 6 and 7 through 10, the guide mechanism 16 includes the wide flat guide block 34, a pair of ball circulation members 104*a*, 104*b* disposed on the guide block 34 and through which the balls 64 are circulated, a pair of covers 106 installed respectively on opposite ends along the longitudinal direction of the guide block 34, and a pair of cover plates 108 for covering surfaces of the covers 106 respectively. The covers 106 are installed so as to cover opposite end surfaces of the guide block 34.

Second ball guide grooves (first circulation passages) 110 are formed along the longitudinal direction on opposite side surfaces of the guide block 34. At regions proximate to the second ball guide grooves 110, a pair of installation grooves 112*a*, 112*b*, in which the ball circulation members 104*a*, 104*b* are inserted, penetrate therethrough along the longitudinal direction. The second ball guide grooves 110 are semicircular shaped in cross section, such that when the slide table 14 is arranged on the upper portion of the guide mechanism 16, the second ball guide grooves 110 are positioned in confronting relation to the first ball guide grooves 66.

The installation grooves 112*a*, 112*b* are formed on the lower surface of the guide block 34, with the ball circulation members 104*a*, 104*b* being disposed in the interiors thereof. Ball circulation holes 114, through which the balls 64 circulate, penetrate through the interior of the ball circulation members 104*a*, 104*b*. On opposite ends thereof, roll-reversing sections 116*a*, 116*b* are disposed respectively for reversing the direction in which the balls 64 circulate. Owing thereto, ball circulation passages, continuous in annular shapes, are formed by the ball circulation holes 114 of the ball circulation members 104*a*, 104*b*, the first ball guide grooves 66 of the slide table 14, and the second ball guide grooves 110 of the guide block 34. The plural balls 64 roll along the ball circulation passages, whereby the slide table 14 can be moved smoothly in a reciprocating manner along the guide mechanism 16.

The linear actuator 10 according to the embodiment of the present invention basically is constructed as described above. Next, operations and effects of the linear actuator 10 shall be described.

At first a pressure fluid from a non-illustrated pressure fluid supply source is introduced into the first port 26. In this case, the second port 28 is placed in a state of being open to atmosphere under the operation of a non-illustrated switching valve.

Pressure fluid supplied to the first port 26 is supplied to one of the penetrating holes 30a, and also is supplied to the other of the penetrating holes 30b through the connection passage 55, whereby the pistons 40 are pressed (in the direction of arrow A) toward the side of the rod holders 52. Consequently, the slide table 14 is displaced together with the piston rods 42, which are connected to the pistons 40, in a direction to separate away from the cylinder main body 12.

At this time, the balls 64 that make up the guide mechanism 16 roll along the ball circulation passages accompanying displacement of the slide table 14, whereby the slide table 14 is guided in the axial direction by the guide mechanism 16.

Additionally, by abutment of the end of the stopper bolt 100, which is provided at one end of the slide table 14, against the end surface of the guide block 34 that constitutes the guide mechanism 16, further displacement of the slide table 14 is stopped, whereupon the slide table 14 reaches its displacement terminal end position.

In the stopper mechanism 18, after loosening the lock nut 102 so as to enable advancing and retracting movements of the stopper bolt 100, the amount at which the stopper bolt 100 projects from the end surface of the holder portion 98 can be adjusted by screw-rotation of the stopper bolt 100, whereby the displacement amount of the slide table 14 can also be adjusted.

On the other hand, in the case that the slide table 14 is displaced in the opposite direction away from the aforementioned displacement terminal end position, the pressure fluid, which was supplied to the first port 26, is supplied with respect to the second port 28, whereas the first port 26 is placed in a state of being open to atmosphere. As a result, by means of the pressure fluid, which is supplied into the pair of penetrating holes 30a, 30b from the second port 28, the pistons 40 are displaced in a direction to separate away from the rod holders 52 (in the direction of arrow B), and the slide table 14 is displaced through the pistons 40 together with the piston rods 42 in a direction to approach the cylinder main body 12. Additionally, upon abutment of the damper 94, which is disposed on the end plate 58 of the slide table 14, against the end surface of the cylinder main body 12, the initial position of the linear actuator 10 is restored.

In the forgoing manner, with the present invention, in the linear actuator 10, when the table main body 56 that makes up the slide table 14 is formed by press molding a plate material made, for example, from a metallic material, the plurality of fitting seats 70a to 70d on which the workpiece W can be mounted can be formed so as to project from the table main body 56. As a result, when the table main body 56 is formed, the plurality of fitting seats 70a to 70d can be formed at the same time, and the linear actuator 10 including the slide table 14 can be manufactured at a reduced cost.

Further, by providing the fitting seats 70a to 70d, which project with respect to the base portion 60 of the table main body 56, and assuring flatness of the fitting seats 70a to 70d by carrying out processing on upper surfaces thereof, compared to a case in which such fitting seats 70a to 70d are not provided while carrying out processing over the entirety of the base portion 60 to assure flatness thereof, the degree of flatness can be maintained with higher precision. As a result, by implementing grinding processing with respect to the plural fitting seats 70a to 70d formed in such a manner, because flatness thereof can be reliably and easily assured, along therewith, workpieces W can be mounted in a stable manner on the upper surface of the slide table 14 and transported stably.

Furthermore, the table main body 56 is formed of martensitic stainless steel having a carbon content of 0.55% to 0.65%, and following press molding, the press molded table main body 56 is subjected to quenching by heating and thereafter cooling by exposure to nitrogen gas. Consequently, the Rockwell C Scale hardness value ($H_RC$) of the table main body 56 can be made to lie within a range of from 58 to 62, and together therewith, high rigidity of the table main body 56 can be maintained. As a result, the strength of the slide table 14 including the table main body 56 can be enhanced and deformation can be suppressed.

More specifically, by utilizing martensitic stainless steel, cooling by exposure to nitrogen gas at the time of quenching is enabled, and deformations that might occur upon carrying out such quenching can be suppressed. Further, in the case that the carbon content of the aforementioned martensitic stainless steel is 0.55% or below, the hardness achieved upon quenching is insufficient, while on the other hand, if the carbon content is 0.65% or greater, then the bending process during performance of press molding becomes impaired and is made difficult. Furthermore, in the case that the Rockwell C Scale hardness value of the table main body 56 is 58 or less ($H_RC \leq 58$), then wear and abrasion of the first ball guide grooves 66 in which the balls 64 roll becomes large, and there is a concern that the durability of the table main body 56 will be lowered. More specifically, in the present embodiment, the hardness of the table main body 56 is set based on the strength required for the first ball guide grooves 66 in which the balls 64 roll.

Moreover, the martensitic stainless steel that forms the material of the table main body 56 is manufactured by cold rolling. Compared to materials manufactured by hot rolling, variances in the thickness dimension are kept small, and dimensional characteristics when the table main body 56 is formed can be controlled with a high degree of precision.

Still further, by use of flat-head bolts for connecting the table main body 56 and the end plate 58 that constitute the slide table 14, the bolt holes in which the head portions 88 of the flat-head bolts are accommodated can easily be formed by press molding with respect to the table main body 56. Owing thereto, advantageously, the bolt holes can easily be formed with respect to the table main body 56, which is formed in a thin plate shape, and on which it is difficult to perform a spot facing process.

Further, because projections 76 are formed on the inner circumferential surfaces of the first and second pin holes 72, 74, when positioning pins P1, P2 are inserted from above for the purpose of positioning the workpiece W that is mounted on the slide table 14, the positioning pins P1, P2 are stopped in engagement with the projections 76, and dropping out (downward falling) of the positioning pins P1, P2 is prevented. Owing thereto, the workpiece W can be positioned on the slide table 14 through the first and second pin holes 72, 74 reliably and with high precision.

Furthermore, when the table main body 56 is press molded, because the fitting seats 70a to 70d, the first and second bolt holes 80, 82, the first and second pin holes 72, 74, and the first ball guide grooves 66 can be formed simultaneously therewith, compared to a case of forming each of such features individually by respective processes, manufacturing steps for the slide table 14 including the table main body 56 can be shortened. In this case, preferably, by making the cross sectional shape of the first ball guide grooves 66, for example, semicircular, the first ball guide grooves 66 can be formed easily by press molding.

Figure 11:
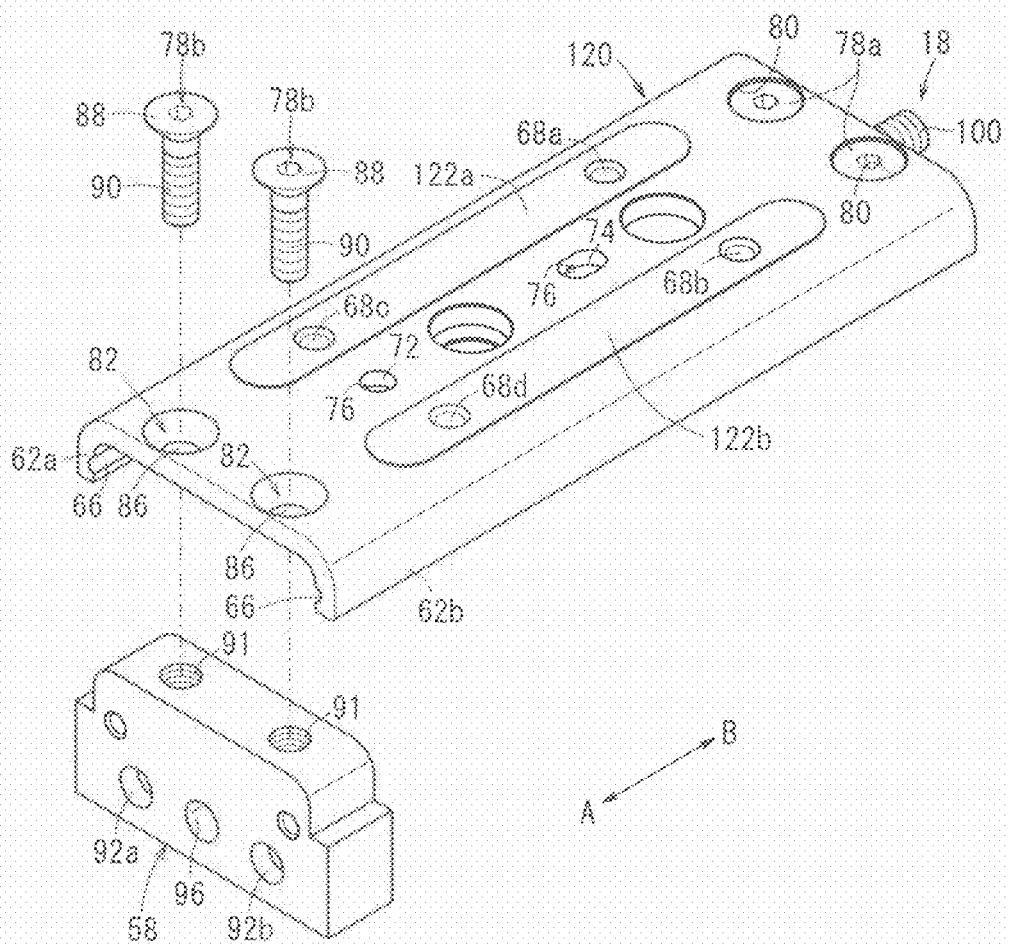
FIG. 11 is an exploded perspective view showing a condition in which an end plate is separated from a slide table according to a modified example.

With the slide table 14 of the linear actuator 10 according to the above-described embodiment, an explanation has been made concerning a structure in which four fitting seats 70a to 70d are disposed at predetermined intervals mutually about the workpiece retaining holes 68a to 68d. However, the invention is not limited to this feature. For example, as shown in FIG. 11, two elongated fitting seats (mounting portions), which span across the workpiece retaining holes 68a and 68c, 68b and 68d along the longitudinal direction (the direction of arrows A and B) of a slide table 120, may be provided. In this case, the two fitting seats 122a, 122b are disposed in parallel along the longitudinal direction of the slide table 120.

In accordance with the above-described structure, the surface area of the fitting seats 122a, 122b on the slide table 120 can be securely enlarged in size, and along therewith, the contact area between the workpiece and the fitting seats 122a, 122b can be made large. As a result, the workpiece that is mounted on the fitting seats 122a, 122b can be transported in a more stable manner.

More specifically, because the fitting seats 70a to 70d, 122a, 122b can be formed at the same time that the slide table 14, 120 is press molded, the fitting seats may be formed in any desirable shape and quantity, etc., corresponding to the shape, size and weight, etc., of the workpiece to be transported.

Further, in the linear actuator 10 according to the aforementioned embodiment, an endless circulating type of linear actuator has been described in which the slide tables 14, 120 are displaced while the balls 64 are circulated endlessly through the first ball guide grooves 66 of the slide tables 14, 120, the second ball guide grooves 110 of the guide block 34 that makes up the guide mechanism 16, and the ball circulation members 104a, 104b. However, the present invention is not limited to such a feature. For example, a linear actuator equipped with the slide tables 14, 120 may comprise a limited type, in which the balls 64 are arranged in a straight line fashion along grooves formed between the slide tables 14, 120 and the guide block 34. In the case of such a linear actuator, a structure is provided in which the balls 64 roll only in straight lines along the grooves and are not circulated endlessly.

The linear actuator according to the present invention is not limited to the embodiment described above, but various alternative or additional features and structures may be adopted without deviating from the essence and scope of the invention as set forth in the appended claims.

What is claimed is:

1. A linear actuator in which, by introduction of a pressure fluid from fluid inlet and outlet ports, a slide table is made to move reciprocally along an axial direction of a cylinder main body, comprising:

the cylinder main body, which communicates with the inlet and outlet ports and having a cylinder chamber into which the pressure fluid is introduced;

the slide table having a base portion disposed substantially parallel to the cylinder main body and a mounting portion that projects with respect to the base portion for mounting an object to be transported thereon, the slide table moving reciprocally along the axial direction of the cylinder main body; and a cylinder mechanism having a piston that is arranged for sliding movement along the cylinder chamber, wherein the slide table is made to move reciprocally upon displacement of the piston, wherein the slide table includes a positioning hole therein into which a positioning member that is installed in the object to be transported is respectively inserted, the positioning hole having a projection projecting radially inward from an inner circumferential surface of the positioning hole to prevent the positioning member from dropping out.

2. The linear actuator according to claim 1, wherein the slide table is formed of martensitic stainless steel having a carbon content of 0.55% to 0.65%.

3. The linear actuator according to claim 1, wherein the slide table is made from a hardened material, the slide table having a Rockwell C Scale hardness value within a range of from 58 to 62 after the quenching and the cooling.

4. The linear actuator according to claim 1, wherein the dropout prevention means comprises a projection, the projection projecting radially inward on an inner circumferential surface of the positioning hole.

5. The linear actuator according to claim 1, further comprising an end plate connected through a piston rod to the piston, which is disposed displaceably in the cylinder chamber, the end plate being connected to an underside of the slide table by a fastening member, wherein a hole is formed in the slide table, and the fastening member is inserted through and accommodated in the hole.

6. The linear actuator according to claim 1, wherein a guide mechanism is attached to the cylinder main body and has a first circulation passage formed therein through which plural balls circulate by rolling, and wherein second circulation passage in which the balls roll is formed in the slide table in a side surface thereof that confronts the guide mechanism.

7. The linear actuator according to claim 6, wherein the second circulation passage is formed with a recessed circular arc shape in cross section, the balls being disposed in abutment against the second circulation passage.

8. The linear actuator according to claim 1, wherein the mounting portion comprises plural mounting portions, and the mounting portions are formed with flat shapes parallel to the base portion, such that the flatness of the plural mounting portions is secured.

9. The linear actuator according to claim 5, wherein the hole includes a conical portion having a tapered shape in cross section, which is gradually reduced in diameter toward a side of the end plate.

10. The linear actuator according to claim 1, further comprising a pair of projections projecting radially inward from an inner circumferential surface of the positioning hole to prevent the positioning member from dropping out, wherein each projection of the pair of projections has a triangular cross section tapering inward.

* * * * *